United States Patent [19]

Izraeli

[11] 4,267,628
[45] May 19, 1981

[54] APPARATUS FOR INSTALLING CABLE COVERINGS

[75] Inventor: Hyman Izraeli, West Caldwell, N.J.

[73] Assignee: Thomas & Betts Corporation, Raritan, N.J.

[21] Appl. No.: 69,223

[22] Filed: Aug. 23, 1979

[51] Int. Cl.³ .............................................. B23P 19/02
[52] U.S. Cl. ...................................... 29/235; 174/135
[58] Field of Search .............. 29/233, 252, 282, 283.5; 174/88 R, 135

[56] References Cited

U.S. PATENT DOCUMENTS

| 3,020,192 | 2/1962 | Stephens et al. | 156/423 |
| 3,138,859 | 6/1964 | Edwards | 29/235 X |
| 3,515,798 | 6/1970 | Sievert | 29/235 X |
| 3,770,876 | 11/1973 | Post | 174/88 R |
| 3,824,331 | 7/1974 | Mixon, Jr. et al. | 29/235 X |
| 3,878,320 | 4/1975 | Mixon, Jr. et al. | 29/235 X |
| 4,016,640 | 4/1977 | Briggs | 29/235 X |
| 4,029,895 | 6/1977 | Scarborough | 174/138 F |
| 4,054,743 | 10/1977 | Mayer et al. | 29/235 X |
| 4,070,746 | 1/1978 | Evans et al. | 29/235 X |

Primary Examiner—James G. Smith
Attorney, Agent, or Firm—James J. Daley; Robert M. Rodrick; Jesse Woldman

[57] ABSTRACT

Apparatus for receiving an insulator assembly supports end closures for relative movement to be placed in fluid sealed relation with ends of the insulator assembly. A fluid conduit extends interior to the end closures and is accessible exteriorly thereof. A unidirectional valve is registered with the conduit whereby the insulator assembly may be interiorly pressurized for expansion of a sleeve member therein.

22 Claims, 14 Drawing Figures

APPARATUS FOR INSTALLING CABLE COVERINGS

FIELD OF THE INVENTION

This invention relates generally to the provision of electrical insulation for cable splices and pertains more particularly to apparatus for installing insulators of resilient character providing watertight seal and affording sufficient flexibility for reeling of the spliced cable.

BACKGROUND OF THE INVENTION

In such fields as underground mining, need arises for on-site splicing of sections of cables which have become separated by reason of mishandling or other abuse common to that environment. In these fields, several approaches have found acceptance, providing for a seamless electrical insulator to extend over the crimped connection of the cables and onto the surfaces of the cable insulation. In one of these approaches, use is made of heat-shrinkable insulator having a diameter exceeding that of the cable insulation and, accordingly, readily applied to the body of one of the cables to be joined and, likewise, easily movable into position over the crimped connection and onto the surfaces of the cables. When so positioned, heat is applied to the insulator, causing same to tightly grip all underlying surfaces and to provide a watertight covering for the splice. Additionally, this type of covering exhibits sufficient strength for cable reeling purposes and otherwise resembles quite closely the original cable insulation in shape and mechanical and electrical properties. The disadvantages attending use of the foregoing heat-shrinking insulators include the time-consuming need for application of heat on-site and deterioration of insulating material by overheating. Additionally, the available materials for heat-shrink application are of limited flexibility.

Another approach in present use involves a pre-stretched tubing type of insulator, inclusive of an additional element, arranged interiorly to the stretched tubing and sufficiently self-sustaining to retain the tubing in stretched condition. Typically, the interior member is in the form of a continuous strip arranged in hollow circular configuration. Once the assembly is placed over a splice to be insulated, the strip member is withdrawn, whereupon the tubing collapses to its original condition, snugly engaging the splice and associated cables. The disadvantages attending this second approach are several. Since the tubing is typically an elastomer, and since the interior member remains in continuous pressure relationship with the elastomer until the point of use, the elastomer frequently takes a set and fails to fully recover its original diameter after long stretching periods. In addition, pre-stretching of the tubing is required to be in excess of the range intended by reason of the presence of the interior member. The removal of the interior member on site gives rise to several difficulties, predominant among which is the consumption of substantial time in the course of removal of the interior member. The uncoiling of the interior member further generally limits application to circular cross-section. Frequently, the uncoiled interior member engages a protrusion, for example, a corner of the ferrule of the splice, which prevents the interior member from further uncoiling and results in an incomplete operation.

A third approach involves the use of an outer member of self-sustaining hollow configuration for retaining insulative tubing in stretched condition. The tubing is stretched within the outer member and an adhesive is employed to bond the stretched tubing to the inner wall of the outer member. The outer member is frangible and is shattered when the expanded tubing is in position over a cable splice. Thereupon, a solvent is introduced through the shattered outer member to release the bond thereof with the tubing. While this approach has advantage in not requiring excess pre-stretching of the tubing to accommodate an inner self-sustaining member and in not involving removal of such inner member, disadvantage remains in that the tubing is in pre-stretched state from the point of product manufacture to point of use. Also, use of the adhesive limits shelf life. Further, toxic solvents are needed for release, presenting difficulty in confined environments. There is also the matter of time consumption in directing solvent into the bonded areas of shattered outer member and relaxed tubing.

SUMMARY OF THE INVENTION

This invention has as its primary object the provision of apparatus for installing a seamless electrical insulator for covering cable splices and the like.

In attaining the foregoing and other objects, apparatus wherein a support member receives an insulator assembly and supports end closures for relative movement therealong for placement in fluid sealed relation with ends of the insulator assembly. A fluid conduit extends into the insulator assembly and the apparatus further includes a valve for such conduit providing unidirectional flow for interior pressurization of the insulator assembly to expand a sleeve member therein. The invention preferably is used with an electrical insulator assembly comprising an outer member of self-sustaining hollow tubular configuration, a sleeve member disposed interiorly of the outer member and being comprised of expandable material and fluid pressure valve means cooperative with the outer member of the assembly and capable of retaining the sleeve member in lengthwise contiguity with the outer member in the absence of fluid pressurization of the assembly. In use of the assembly, the sleeve is placed within the outer member and the sleeve ends are placed in fluid-tight relationship with the outer member, as by stretching the sleeve ends outwardly onto exterior surface of the outer member. The sleeve is then expanded by the apparatus of this invention to become contiguous with the outer member, the fluid pressure valve means permitting egress of air entrapped between the sleeve member and the outer member in the course of such expansion of the sleeve member. The valve means is unidirectional in flow character, whereby air is not permitted to reenter the assembly once it has been expelled. The outer member and contiguous sleeve are now placed in circumscribing relation to one of the cables to be spliced together. The splice is now made as between such cable and a second cable and the insulator assembly is now moved to encompass the entire splice. At this juncture, the unidirectional flow characteristic of the valve means is altered, for example, by removing the valve means from the assembly, whereupon the sleeve member collapses onto the splice. The outer member is preferably transparent and made of a frangible or cuttable material such that it may be readily removed from the completed splice as by simple fracture thereof.

In a particularly preferred embodiment of the insulator assembly, the outer member is made throughout of air-impermeable material and includes a passage or passages for the flow of air therethrough. In such embodiment, the unidirectional valve means comprises a tape in registry with each of such passages. Such tape is blown clear of the registering passage on expansion of the sleeve member into contiguity with the outer member and returns, under ambient pressure, to sealing relation with the passage through the outer member on completion of expansion of the sleeve member. Once the assembly is in position over the cable splice, the tapes are torn from the outer member, giving rise to collapse of the sleeve member onto the splice.

The aspect of the invention whereby the sleeve member is expanded on site at the time of usage of the assembly has particular benefit in limiting the time duration of stretching of the sleeve member to a quite short period of time. Also, as there is no need to accommodate a removable member within the sleeve member, to be placed therewith on the cables and then removed, the invention assures that only essential stretching of the sleeve member to a diameter larger than that of the associated cables is involved.

The foregoing and other objects and features of the invention will be further evident from the following detailed description of preferred embodiments thereof and from the drawings wherein like reference numerals identify like parts throughout.

Figure 1:
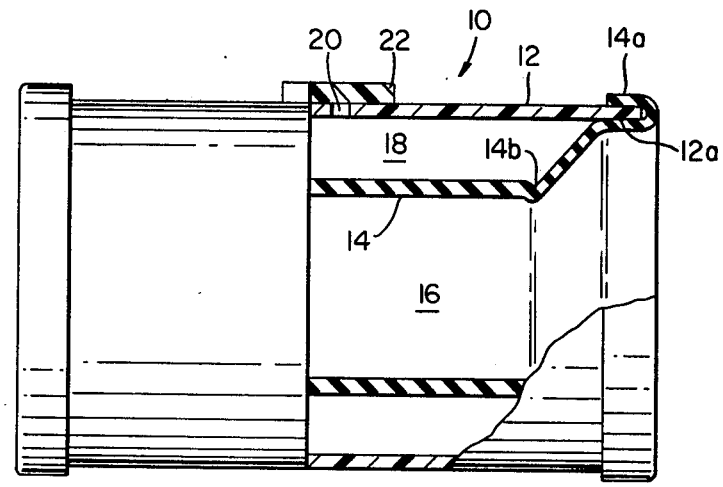
FIG. 1 is a side elevational view of the insulator assembly of the invention, partly broken away to show interior detail.

DESCRIPTION OF PREFERRED EMBODIMENTS AND PRACTICES:

Referring to FIG. 1, electrical insulator assembly 10 includes an outer member in the form of hollow shell 12, preferably constituted by a hard shell plastic extrusion of transparent frangible material, for example, modified styrene. As such, shell 12 is a relatively rigid body of self-sustaining hollow configuration, typically circular in cross-section.

Assembly 10 further includes an inner member in the form of elastomeric sleeve 14, selected to have a lengthwise cross-sectional area less than that of cables with which assembly 10 is to be used, such cross-section to be expanded, as discussed below, to become essentially contiguous with the interior surface of shell 12, thereby capable of being freely applied to cables to be spliced. In reaching the assembly of FIG. 1, end portion 14a of sleeve 14 is stretched radially outwardly to circumscribe and engage in fluid sealed relation the end surface 12a of shell 12. Open ends of shell 12 and sleeve 14 are accordingly placed in registry and assembly 10 defines a passage 16 extending leftwardly from the opening illustrated in FIG. 1, such passage to either terminate within assembly 10 or continue therethrough to leftward registered openings of shell 12 and sleeve 14. The FIG. 1 embodiment is for purposes of insulatively covering a splice of two electrical cables and, accordingly, assembly 10 has opposite open ends. Sleeve 14 may be notched, as shown at 14b, whereby the extent of the sleeve from portion 14b to portion 14a may be removed following completion of the insulative covering of the cable splice. The configuration of the sleeve is preferably such that notched portion 14b is necked down from its diameter leftward thereof in FIG. 1, thereby increasing hoop stress at the point of cable entry when assembled upon the cable and, on the other hand, permitting fully relaxed condition of necked-down portions when the assembly is not expanded. As indicated, the outer surface of portion 14b is tapered radially inwardly to the notch so as to provide a smooth transition surface when relaxed and separated from the tear-away extent 14a-14b. The relaxed flare of the tear-away extent has advantage in facilitating application of the sleeve ends about the shell ends without undue stretching and has still further benefit as discussed below in connection with FIG. 6.

With shell 12 and sleeve 14 arranged as in FIG. 1, assembly 10 includes a confined volume 18 which is annular to passage 16 and bounded by radially interior surface of shell 12 and radially exterior surface of sleeve 14. Shell 12 includes a passage 20 communicating with volume 18. Flap valve 22 is supported by shell 12 in registry with passage 20 and provides fluid sealing thereof. Based on the fluid impermeable character of shell 12 and of sleeve 14 and of the fluid seals provided by valve 22 and shell surface 12a and sleeve portion 14a, volume 18 is entrapped within assembly 10. Valve 22 may be comprised of a pressure-sensitive tape, releasably secured at one end thereof to shell 12.

Figure 2:
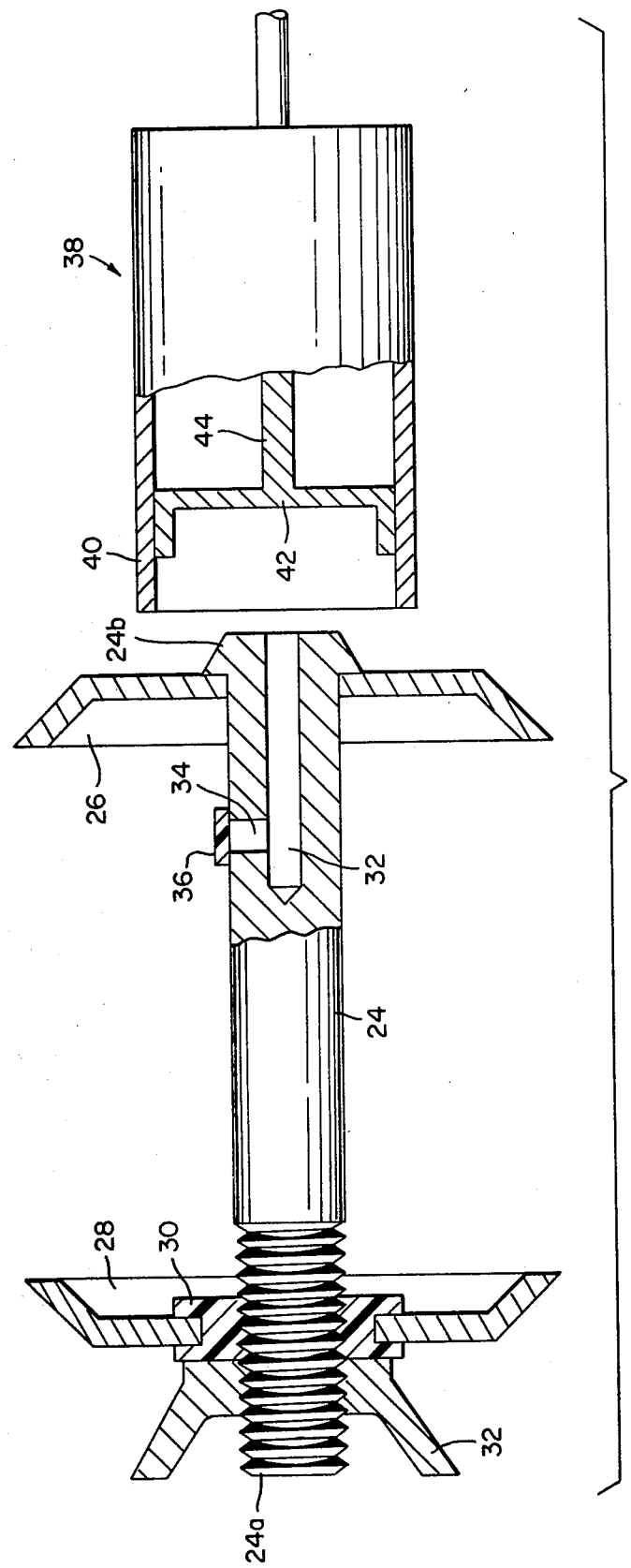
FIG. 2 is a side elevation, again broken away in part to show interior detail, of apparatus for use in the installation of insulator assemblies according with the invention.

Suitable apparatus for on-site preparation of assembly 10 for splice-covering use, as by expansion of sleeve 14, is set forth in FIG. 2. Positioning stud 24 has fixedly connected thereto a first end cap 26 and further supports end cap 28 for adjustable longitudinal positioning on stud threaded end portion 24a. Grommet 30, integral with end cap 28, provides fluid sealed support as between end cap 28 and stud 24 and end cap 28 is positionally adjustable on stud 24 by advancement of wing nut 31 on stud threaded portion 24a. A fluid passage 32 extends within the stud 24 leftwardly of end cap 26 and opens into end portion 24b of the stud. A radial port 34 extends off passage 32 and flap valve 36 is in registry with port 34, providing fluid sealing for the port. As in the case of valve 22 above, valve 36 may be comprised of a pressure-sensitive tape affixed at one end to stud 24. Rightwardly of end cap 26 in FIG. 2 is shown a fluid pressure pump 38 comprised of cylinder 40, piston 42 and shaft 44.

Figure 3:
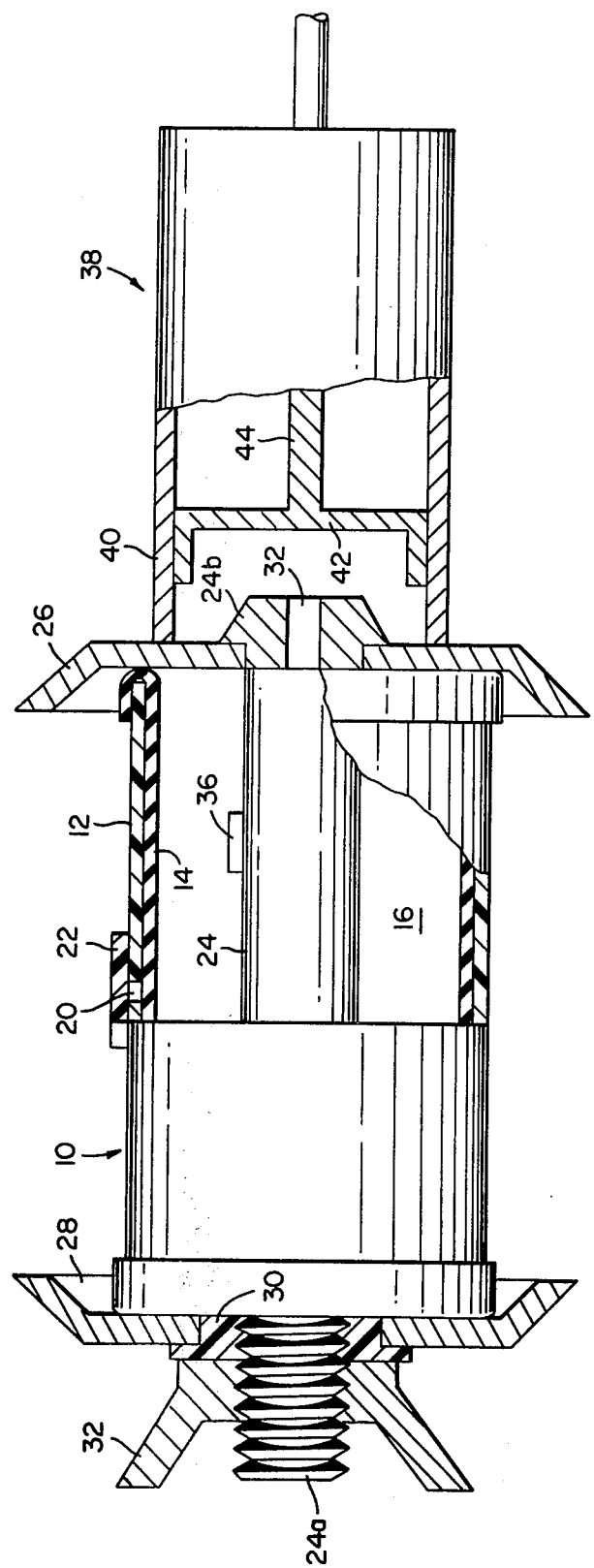
FIG. 3 is a composite side elevation, showing the assembly of FIG. 1 in sleeve-expanded condition by the apparatus of FIG. 2.

FIG. 3 depicts the components above discussed in FIGS. 1 and 2 in assembled on-site condition with sleeve 14 expanded into contiguous relation with shell 12. Preparatory to sleeve expansion, wing nut 31 and end closure 28 are separated from stud end portion 24a and stud 24 is seated within passage 16 of assembly 10, sleeve 14 being in relaxed condition shown in FIG. 1. Wing nut 31 and end closure 28 are now advanced on stud portion 24a so as to mutually position end closures 26 and 28 in fluid sealing relationship with assembly 10. Pump 38 is now secured to the rightward surface of end closure 26 in fluid sealed relation and the pump is operated to pressurize passage 16, flap valve 36 being displaced to open port 34 on leftward stroke of piston 42 and being returned to fluid sealing relation with port 34 on rightward stroke of piston 42. In the course of expansion of sleeve 14, valve 22 is operably responsive to fluid pressure change in confined volume 18 (FIG. 1) and to fluid pressure ambient to the assembly for controlled diminution of volume 18. Thus, on pressurization of volume 18 exceeding ambient, i.e., pressure exterior to assembly 10, valve 22 is displaced from fluid sealing relation with passage 20. Concomitantly, atmospheric pressure forces valve 22 into closing relationship with passage 20 in the absence of pressure change in volume 18, i.e., on rightward stroke of piston 42.

Upon completion of expansion of sleeve 14, the sleeve-expanded assembly 10 is removed from the apparatus of FIG. 2 by withdrawal therefrom of wing nut 31 and end closure 28.

Figure 4:
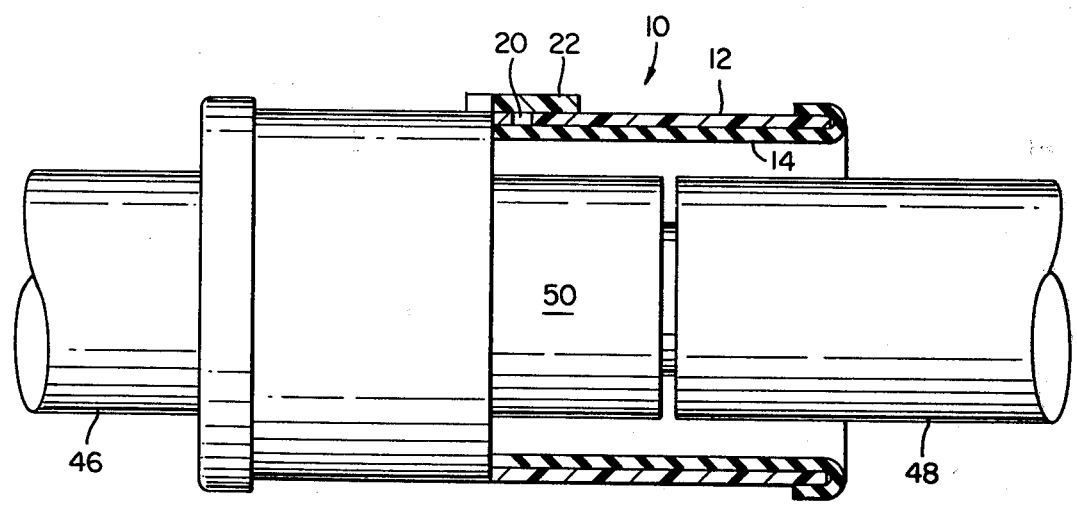
FIG. 4 illustrates the sleeve-expanded assembly of FIG. 3 in position circumscribing a splice of two cables.
Figure 5:
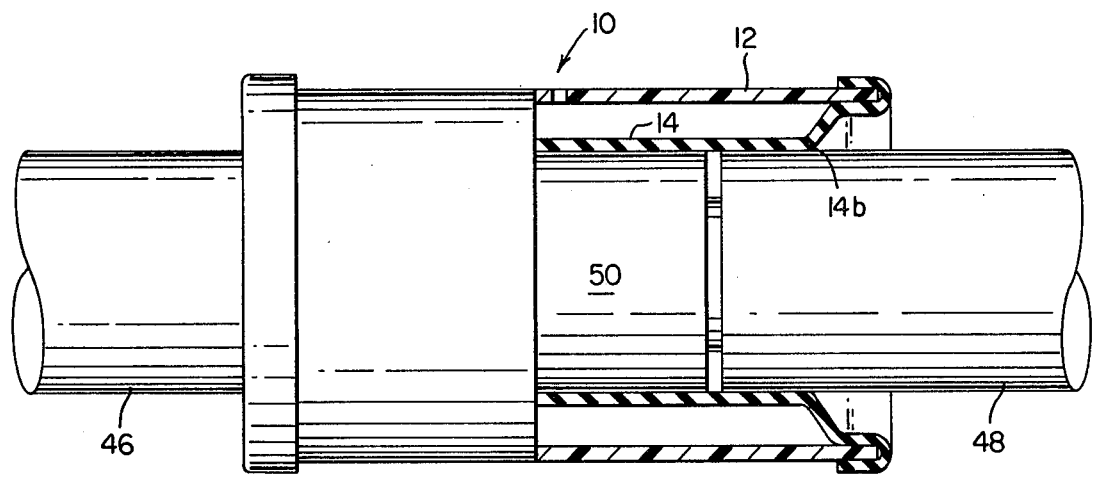
FIG. 5 is a successive showing of the FIG. 4 arrangement wherein the unidirectional valve is stripped from the insulator assembly and the sleeve collapses upon the splice.

Upon separation of the expanded insulator assembly from the apparatus of FIG. 3, it is to be appreciated that the assembly remains in sleeve-expanded condition in the absence of fluid pressurization of the assembly subsequent to such expansion of its sleeve into contiguous relation with the shell. Accordingly, assembly 10 may be freely advanced onto an electrical cable 46 (FIG. 4), and displaced far leftwardly of its illustrated position, to facilitate joinder of cable 46 to cable 48, as by the crimping of ferrule 50 on exposed conductors of the cables. Following such splicing of cables 46 and 48, cable assembly 10 is positioned symmetrically relative to ferrule 50, as in FIG. 4, and valve 22 is separated from assembly 10, as by tearing such flap tape from the exterior surface of shell 12. On this event, the retention of sleeve 14 in expanded condition by valve 22 is interrupted and sleeve 14 collapses upon the completed splice, as is shown in FIG. 5. By preselection of the relaxed cross-section of sleeve 14 (FIG. 1) to be less than the cross-section of the completed splice, sleeve 14 stretchingly circumscribes the completed splice in FIG. 5, not yet having reached its fully relaxed cross-section.

At this juncture, shell 12 is fractured, as may be accomplished by impacting the shell with shattering force. Thereupon, the shell is readily removed from sleeve 14 and the outward ends of the sleeve may be severed at notches 14b (FIG. 6).

Figure 6:
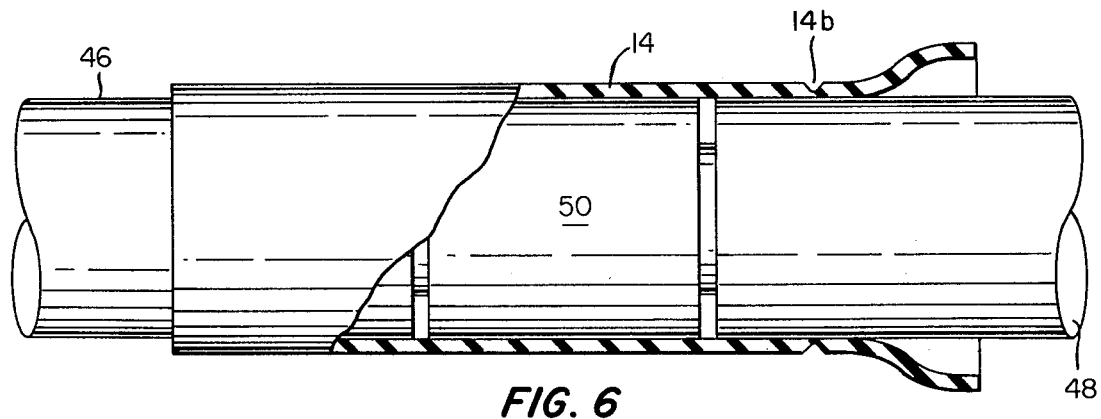
FIG. 6 shows the completed insulator-covered splice, the outer member having been removed and the sleeve member being shown in section for purposes of illustration.

In the FIG. 6 showing, sleeve 14 is shown prior to severing of its rightward removable end portion. As alluded to above, benefit attends the flared configuration of such end portion in that one can readily roll the sleeve back upon itself to any extent desired, simply by engaging a flared end, which is in relaxed state, in contrast to the situation applying in the case of a shrunk sleeve tightly circumscribing the cable at sleeve ends. Need for rolling back the sleeve arises, for instance, when it is desired to apply treating compound interiorly of the sleeve or when cleaning of the cable is necessary. After roll back and cable treating, the sleeve is rolled forward and the end portion is severed.

Figure 11:
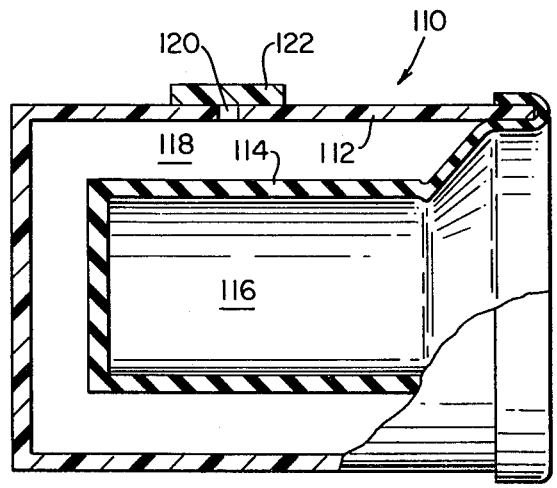
FIG. 11 illustrates a further embodiment of the invention for use in insulating a single cable termination.

A further embodiment of insulator assembly 110 is shown in FIG. 11 for use in insulatively covering terminations of a cable or group of cables. In this situation, shell 112 is continuous about one end thereof and defines a single rightward opening. Similarly, sleeve 114 is stretched to engage only such open end of shell 112, sleeve 114 defining passage 116 which has one closed end. Combined volume 118 is now continuous radially across the leftward end of shell 112. Passage 120 and valve 122 are included as in the foregoing embodiment and function likewise on expansion of sleeve 114. Shell 112 may be an injection molded part in its FIG. 11 configuration, wherein its closed end is integrally formed. Alternately, the shell may be formed in part as an extruded cylinder with open ends, one of which may be fluid sealed by an end cap joinable therewith. End caps may desirably be provided as parts of a field kit, the shell having at least one open end, in any event. With the shell and sleeve assembled as in FIG. 1 and end caps applied to ends thereof, dust protection and protection for any material applied to the sleeve are afforded. Where such end caps provide fluid sealing, and are applied after sleeve stretching, fluid sealed relation of sleeve and shell may be maintained for a longer time period than would otherwise apply. The end caps are removed on-site at the time of use of the assemblies.

For purposes of expanding sleeve 114, and as substitute apparatus to that shown in FIG. 2 for expanding a sleeve having opposite ends open, use may be made of an expandable air bag disposed in passage 16 for passage 116. Use of an air bag permits use of fluid medium for sleeve expansion which may be a contaminant to the splice or termination, e.g., an electrically conductive liquid, based on isolation of the fluid medium from the sleeve by the air bag.

As insulator assemblies of type disclosed herein are not of type deriving sleeve support from an interior removable element, they may be provided in any cross-sectional configuration to conform with the member to be covered. Further, the member to be covered may be coated with an adhesive or other filler which will not be disturbed since no removable member is interior to the sleeve on completion of covering. While it is preferable to avoid shelf storage of sleeves in expanded condition, assemblies of type disclosed herein may have their sleeves expanded and stored in such condition.

The assemblies may include design detail for lessening the possibility that shell passage, or passages 20 of FIG. 1 become blocked interiorly by sleeve 14 and thwarted from fully evacuating volume 18. By way of example, a network of grooves may be formed on the interior surface of shell 12 in communication with the shell passages, with the passage valve being located radially outwardly of intersections of the grooves. Another such practice is to taper sleeve wall thickness such that sleeve thickness in registry with the shell passages is greater than sleeve thickness at locations remote from the shell passages. In this instance, it need be observed that the mechanical and electrical strengths of the installed sleeve will be minimum at the thinnest sleeve sections. A further practice looks to providing longitudinal protrusions or spaced dimples on the sleeve to assure full evacuation of confined volume 18.

In summary of the installation apparatus of the invention, as shown particularly in FIGS. 2 and 3, support means thereof both receives and fluid seals the insulator assembly and comprises a pair of end caps or closures which are relatively movable along a stud or spacer element into fluid sealed relation with the insulator assembly ends. Fluid, i.e., air or other fluid medium, is conducted into the insulator assembly from a pressurized source, e.g., pump or compressed gas canister, by a conduit, preferably extending through the spacer element. A unidirectional flow valve is preferably on the spacer element, covering a conduit outlet port therein. In form shown, the valve is fluid-pressure responsive in operation, providing fluid flow therethrough when conduit fluid pressure exceeds pressure within the insulator assembly and precluding fluid flow therethrough when pressure within the insulator assembly exceeds conduit pressure.

Figure 7:
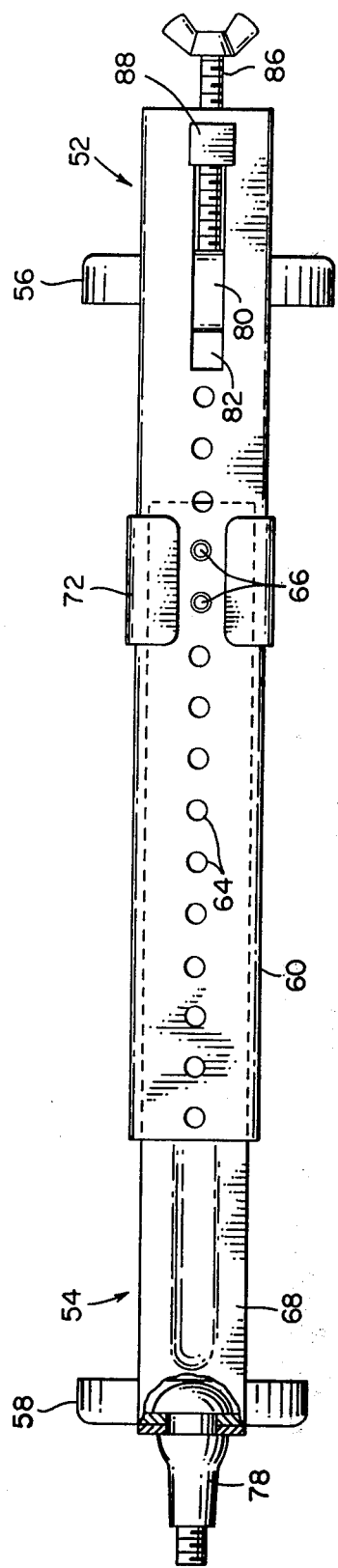
FIG. 7 is a side elevation of alternate apparatus for use in the installation of insulator assemblies.
Figure 8:
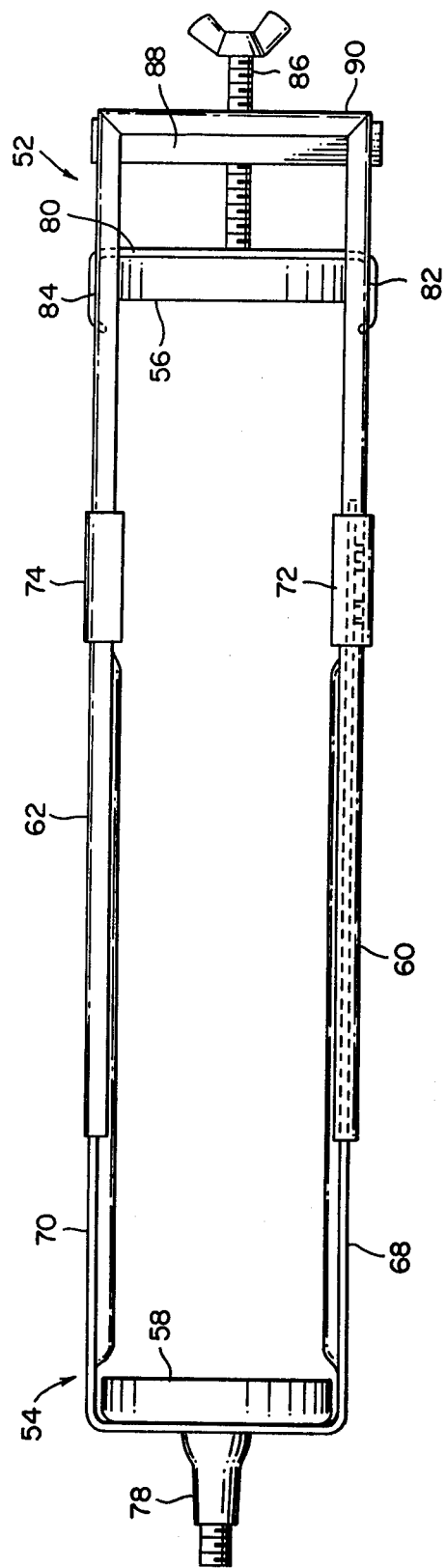
FIG. 8 is a plan view of the apparatus of FIG. 7.

Referring to FIGS. 7 and 8, apparatus is shown which is more readily usable than the apparatus of FIG. 2 in the installation of a variety of different length insulations and which accommodates also the FIG. 11 assembly. An outer frame 52 receives an inner frame 54 and interlocks therewith in manner permitting the varying of the spacing between end caps 56 and 58 to position same in engagement with an insulator assembly. Side arms 60 and 62 of outer frame 52 have apertures 64 along the lengths thereof for receiving lugs 66 which project outwardly of side arms 68 and 70 of inner frame 54. Clips 72 and 74 are slidable respectively on side arms 60 and 62 into locking relation relative to lugs 66 and apertures 64. In adjusting the apparatus for receiving a given length insulator assembly, clips 72 and 74 are moved clear of the rightward ends of side arms 68 and 70, freeing the same for inward flexing and accompanying release of lugs 66 from apertures 64. The inner frame is now repositioned in flexed condition relative to the outer frame to accommodate the insulator assembly and the side arms are then released such that lugs 66 re-engage apertures 64. Clips 72 and 74 are then moved into registry with the lugs.

End cap 58 is fixedly secured to end part 76 of inner frame 54 by frictional interfitting of valve stem 78 with cap 58 and end part 76. End cap 56 is secured to plate 80, which has side portions seated in slots 82 and 84 of outer frame 52. Threaded member 86 is journaled in plate 80 and extends through support 88 outboard of end part 90 of outer frame 52. As member 86 is rotated, end cap 56 is moved relative to outer frame 52, thereby providing vernier adjustment of spacing between the end caps to accomodate fluid sealing of the insulator assembly. On such adjustment, the insulator assembly may be positively pressurized, for example, by applying a pressurized capsule to valve stem 78. In this apparatus embodiment, the valve of the pressurizing apparatus is exterior to the end caps, in contrast to the FIG. 2 apparatus. As will be appreciated, pressurization medium may comprise a carbon dioxide cylinder, factory pressurized air and the like.

Figure 10:
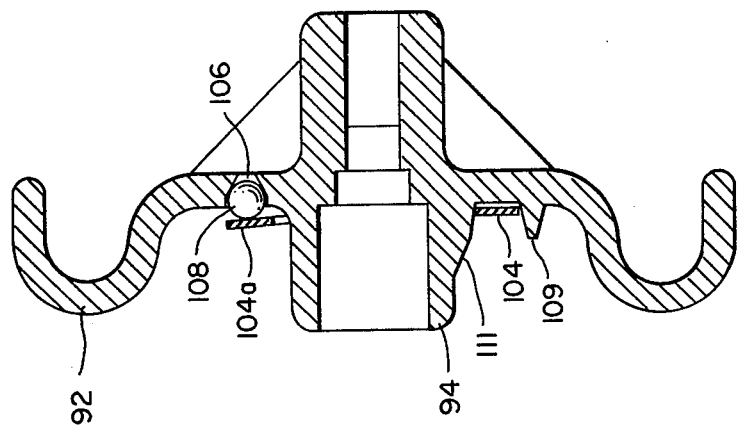
FIG. 10 is a sectional view taken along line X—X of FIG. 9.
Figure 9:
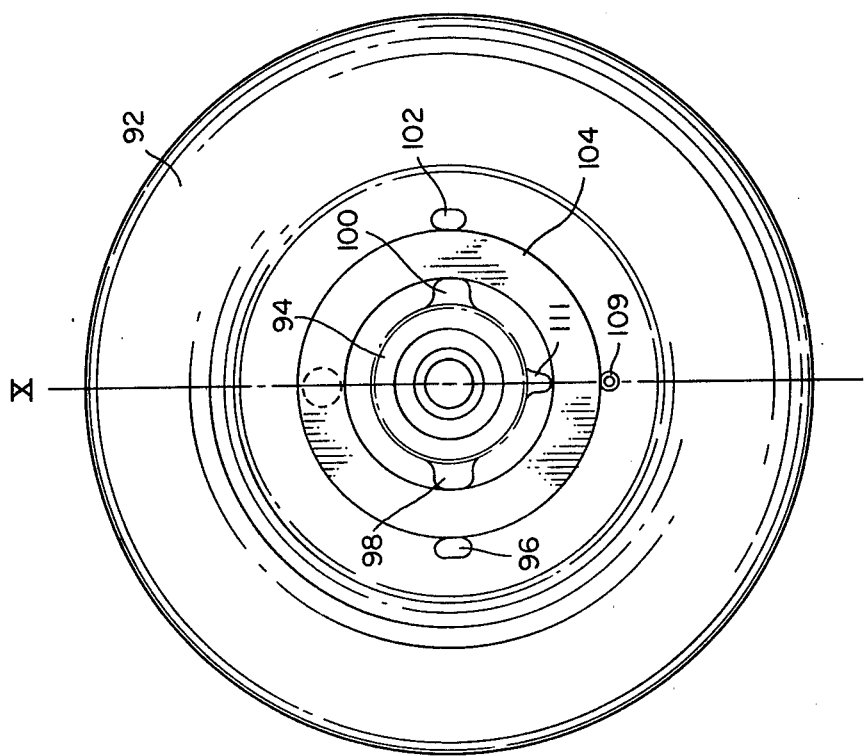
FIG. 9 is a plan view of a protective end cap for use with installation apparatus.

FIGS. 9 and 10 depict protective end cap structure for installation apparatus. In this embodiment, a pressure release is introduced in end cap 92 by staking to neck 94 thereof, as at locations 96, 98, 100 and 102, a washer 104. The end cap defines tapered passage 106 for receipt of ball valve 108. With the washer located by guides 109 and 111 adjacent neck 94, and then staked as noted above, the washer defines a cantilevered leaf spring portion 104a atop ball valve 108. By selection of washer material and thickness, ball valve displacement from passage 106 may be predetermined to prevent pressurization of an insulator assembly in excess of that required for sleeve expansion.

As in the apparatus embodiment of FIG. 2, the apparatus embodiment of FIGS. 7 and 8 includes, in valve stem 78, unidirectional flow valve means and fluid conduit accessible exteriorly of its support structure. In its inclusion of releasably interlockable elongate frames and clip means for preventing release of such interlocking of the frames, and in its inclusion of mutually complementary locking means on the frames, the apparatus of FIGS. 7 and 8 has advantage, as alluded to above, for accomodating quite extensive insulator assembly size variation. Alternatively, one may extend the threaded portion of stud 24 of FIG. 2 to the full length thereof, but length adjustment will evidently be more time consuming than in the FIGS. 7 and 8 apparatus.

Figure 12:
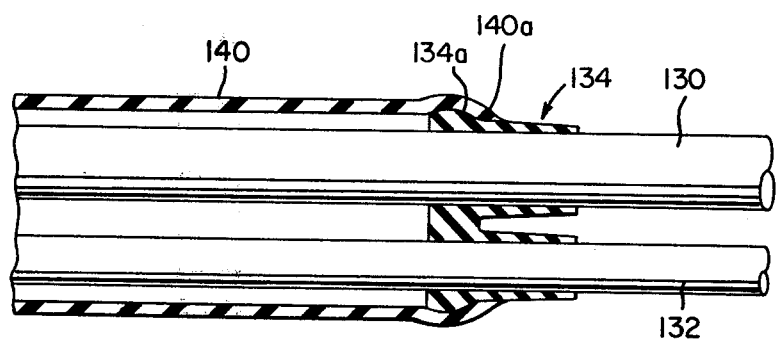
FIG. 12 shows a completed insulator—covered multiple cable installation in accordance with the invention, partly broken away to show detail.
Figures 13, 14:
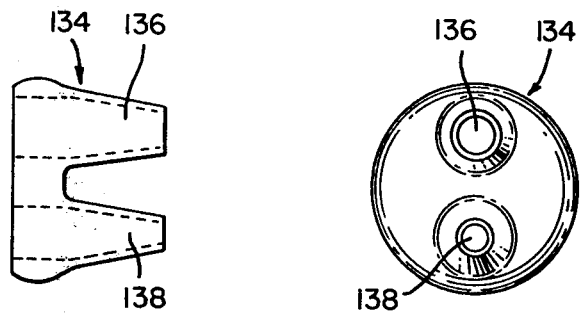
FIG. 13 is a front elevation of the end cap of FIG. 12 prior to insertion of cables therein.
FIG. 14 is a side elevation of FIG. 13.

FIGS. 12-14 indicate a further usage of insulation assemblies hereof, namely, in providing a boot for multiple conductor cables. Cables 130 and 132 are insulated conductors of multiconductor cable having outer insulation (not shown) circumscribing the cables. At junction locations, it is desirable to extend the cables, as indicated in FIG. 12, with the outer insulation removed and yet to prevent moisture interiorly of the outside insulation. A range-taking cap 134 having tapered passages 126 and 138 is employed, providing fluid-sealing of cables 130 and 132 at their rightward points of exit from passages 136 and 138. Then, sleeve 140 is assembled with a shell and is expanded as above discussed and the assembly is disposed with its rightward notched portion 140a rightwardly beyond radially extended portion 134a of end cap 134 and with its leftward notched portion leftwardly beyond the multiconductor cable outer insulation (not shown). The sleeve is now released from its expanded state and engages the outer insulation and end cap 134, this condition having been reached in FIG. 12.

As stated above, shell material is preferably transparent. This characteristic enables one to visually observe sleeve expansion through the shell in the course of pressurization of the assembled shell and the sleeve. While the shells are conveniently comprised of frangible material, such as modified styrene, they may be constituted of material otherwise readily removable from the sleeve on release thereof. Thus, one may cut longitudinally through the shell and open the cut shell to remove it from a cable.

Various modifications to the above-discussed apparatus and changes to components thereof will now be evident to those skilled in the art. Accordingly, the particularly disclosed and discussed embodiments are intended in an illustrative and not in a limiting sense. The true spirit and scope of the invention is set forth in the following claims.

What is claimed is:

1. Apparatus for expansion of a sleeve member assembled interiorly of an outer member of hollow self-sustaining configuration, such assembly having opposed first and second open ends and a passage therebetween circumscribed by said sleeve member, said apparatus comprising:

support means for receiving said assembly and for fluid sealing said passage, including first and second end closures and spacer means supporting said first and second end closures for relative movement therebetween for placement of said first and second end closures in respective fluid sealed engagement with said first and second ends of said assembly;

fluid conduit means accessible exteriorly of and extending through said support means to an outlet in juxtaposition with said passage;

and, unidirectional flow valve means supported by said support means in registry with said conduit means and said passage.

2. The apparatus claimed in claim 1 wherein said valve means is operably responsive to fluid pressure in said conduit means exceeding fluid pressure in said passage to provide for fluid flow through said valve means, said valve means being further operably responsive to fluid pressure in said passage exceeding fluid pressure in said conduit to preclude fluid flow through said valve means.

3. The apparatus claimed in claim 1 wherein said spacer means comprises an elongate member extending between said first and second end closures and supporting at least one such end closure for movement longitudinally of said elongate member.

4. The apparatus claimed in claim 3 wherein said elongate member defines a conduit extending therein and constituting said conduit means.

5. The apparatus claimed in claim 4 wherein said elongate member defined a port therein constituting said conduit means outlet and wherein said conduit extends from said port to an inlet opening accessible exteriorly of said support means.

6. The apparatus claimed in claim 5 wherein said valve means is secured to exterior surface of said elongate member and is in registry with said elongate member port.

7. The apparatus claimed in claim 6 wherein said valve means comprises a flap member secured at one end thereof to said elongate member.

8. The apparatus claimed in claim 7 wherein said flap member is a pressure-sensitive tape.

9. The apparatus claimed in claim 1 further including a pressurized fluid source in communication with said conduit means exteriorly of said support means.

10. Apparatus for expansion of a sleeve member assembled interiorly of an outer member of hollow self-sustaining configuration, such assembly having opposed first and second ends and a passage therebetween circumscribed by said sleeve member, said apparatus comprising: an elongate support member for disposition in said passage; first and second end closures supported by said support member for relative movement longitudinally into fluid sealed engagement respectively with said assembly first and second ends; a fluid conduit extending through said support member from an outlet port located therein longitudinally between said first and second end closures and opening into an end of said support member; and valve means for providing unidirectional flow through said conduit, said valve means being secured to exterior surface of said support member and in registry with said port thereof.

11. The apparatus claimed in clam 10 wherein said valve means comprises a flap member secured at one end thereof to said support member.

12. The apparatus claimed in claim 11 wherein said flap member is a pressure-sensitive tape.

13. The apparatus claimed in claim 10 further including a pressurized fluid source in communication with said conduit.

14. The apparatus claimed in claim 1 wherein said spacer means comprises first and second elongate frames respectively supporting said first and second end closures, said first and second frames being releasably interlockable and longitudinally movable to provide variation in the longitudinal spacing of said first and second end closures.

15. The apparatus claimed in claim 14 wherein said first frame supports said first end closure for adjustable longitudinal positioning therein.

16. The apparatus claimed in claim 14 wherein said fluid conduit means is supported by one of said first and second end closures.

17. The apparatus claimed in claim 14 wherein said first frame includes first side arms extending longitudinally thereof, said first side arms including first locking means longitudinally spaced therein, and wherein said second frame includes second side arms extending longitudinally thereof, said second side arms including second locking means longitudinally spaced therein and complementary to said first locking means for providing such releasable interlocking of said first and second frames.

18. The apparatus claimed in claim 17 further including clip means movable with respect to said first and second side arms into registry with said first and second locking means to prevent release of such interlocking of said first and second frames.

19. The apparatus claimed in claim 1 further including protective means responsive to fluid pressure level in said passage in excess of a predetermined fluid pressure level for interrupting such fluid sealed engagement of said first and second end closures with said first and second ends of said assembly.

20. The apparatus claimed in claim 19 wherein said protective means comprises a pressure release valve in one of said end closures.

21. The apparatus claimed in claim 20 wherein such one end closure defines a passage therethrough, said pressure relief valve further comprising a valve member disposed in said passage and spring means for biasing said valve member into sealing relation with said passage.

22. The apparatus claimed in claim 21 wherein said spring means comprises a washer having a portion thereof overlying said valve member and so secured to said one end closure as to dispose said portion in cantilever relation to said valve member.

* * * * *